США010042053B2

(12) United States Patent
Slindee et al.

(10) Patent No.: US 10,042,053 B2
(45) Date of Patent: Aug. 7, 2018

(54) ULTRASONIC CHARGE PORT DETECTOR

(71) Applicant: Faraday&Future Inc., Gardena, CA (US)

(72) Inventors: Richard Edward Slindee, Los Angeles, CA (US); Mitchell Paul Pederson, Gardena, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 160 days.

(21) Appl. No.: 15/246,182

(22) Filed: Aug. 24, 2016

(65) Prior Publication Data

US 2018/0059242 A1    Mar. 1, 2018

(51) Int. Cl.
G01S 15/42    (2006.01)
G01S 15/88    (2006.01)
B60L 11/18    (2006.01)

(52) U.S. Cl.
CPC .......... G01S 15/42 (2013.01); B60L 11/1827 (2013.01); G01S 15/88 (2013.01)

(58) Field of Classification Search
CPC ...................... B60L 11/1809; B60L 11/1827
See application file for complete search history.

(56) References Cited

U.S. PATENT DOCUMENTS

| 6,157,162 | A  | * | 12/2000 | Hayashi ............. B60L 11/1818 320/104 |
| 9,252,584 | B2 | * | 2/2016 | Aldrich ................. H02G 11/02 |
| 9,550,428 | B1 | * | 1/2017 | Ertel ................... B60L 11/1835 |
| 2003/0146867 | A1 | * | 8/2003 | Kornle ................. G01F 23/284 342/124 |
| 2013/0193918 | A1 | * | 8/2013 | Sarkar ...................... B60L 3/04 320/109 |
| 2017/0182912 | A1 | * | 6/2017 | Simonini ............... B60L 15/20 |

* cited by examiner

*Primary Examiner* — Hovhannes Baghdasaryan
(74) *Attorney, Agent, or Firm* — Lee & Hayes PLLC

(57) ABSTRACT

A charge port detector system may include a charger arm, a set of ultrasonic sensors carried by the charger arm, and one or more physical processors. The set of ultrasonic sensors may receive ultrasonic signals from one or more ultrasonic emitters of a charging target. Times at which the set of ultrasonic sensors received the ultrasonic signals may be obtained. The charger arm may be moved based on the times at which the set of ultrasonic sensors received the ultrasonic signals. The movement of the charger arm may align the charger arm to a charge port of the charging target.

20 Claims, 18 Drawing Sheets

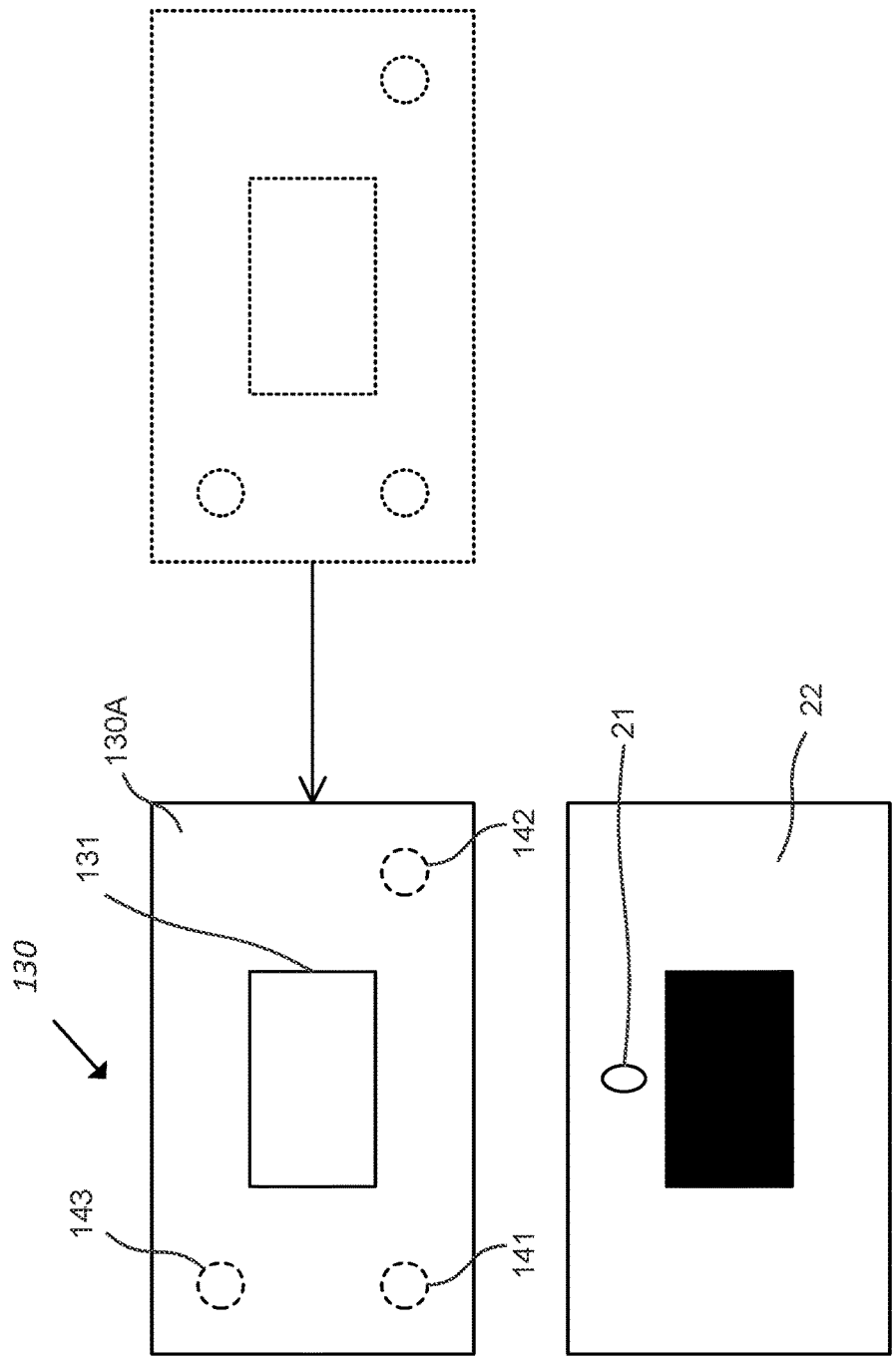

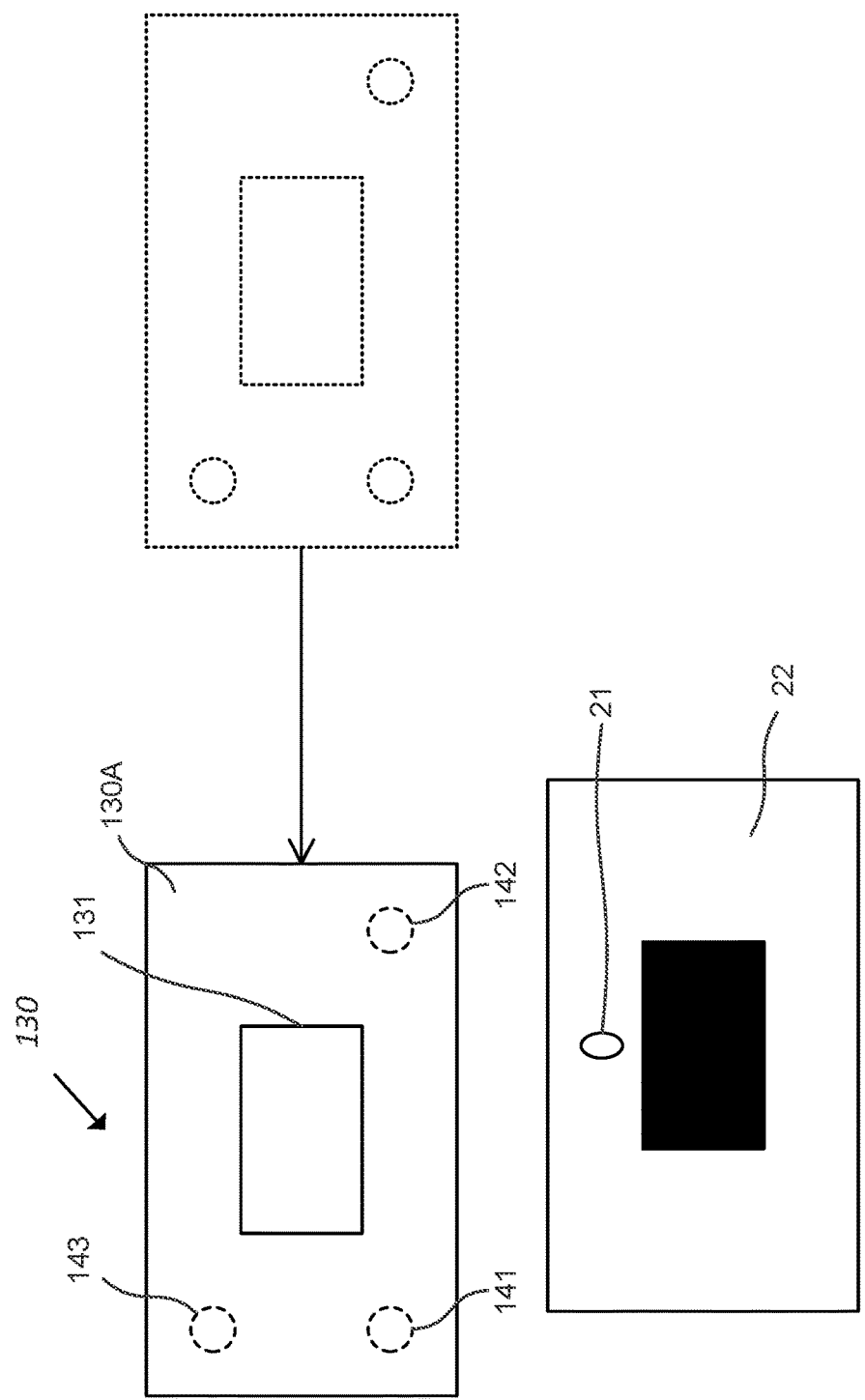

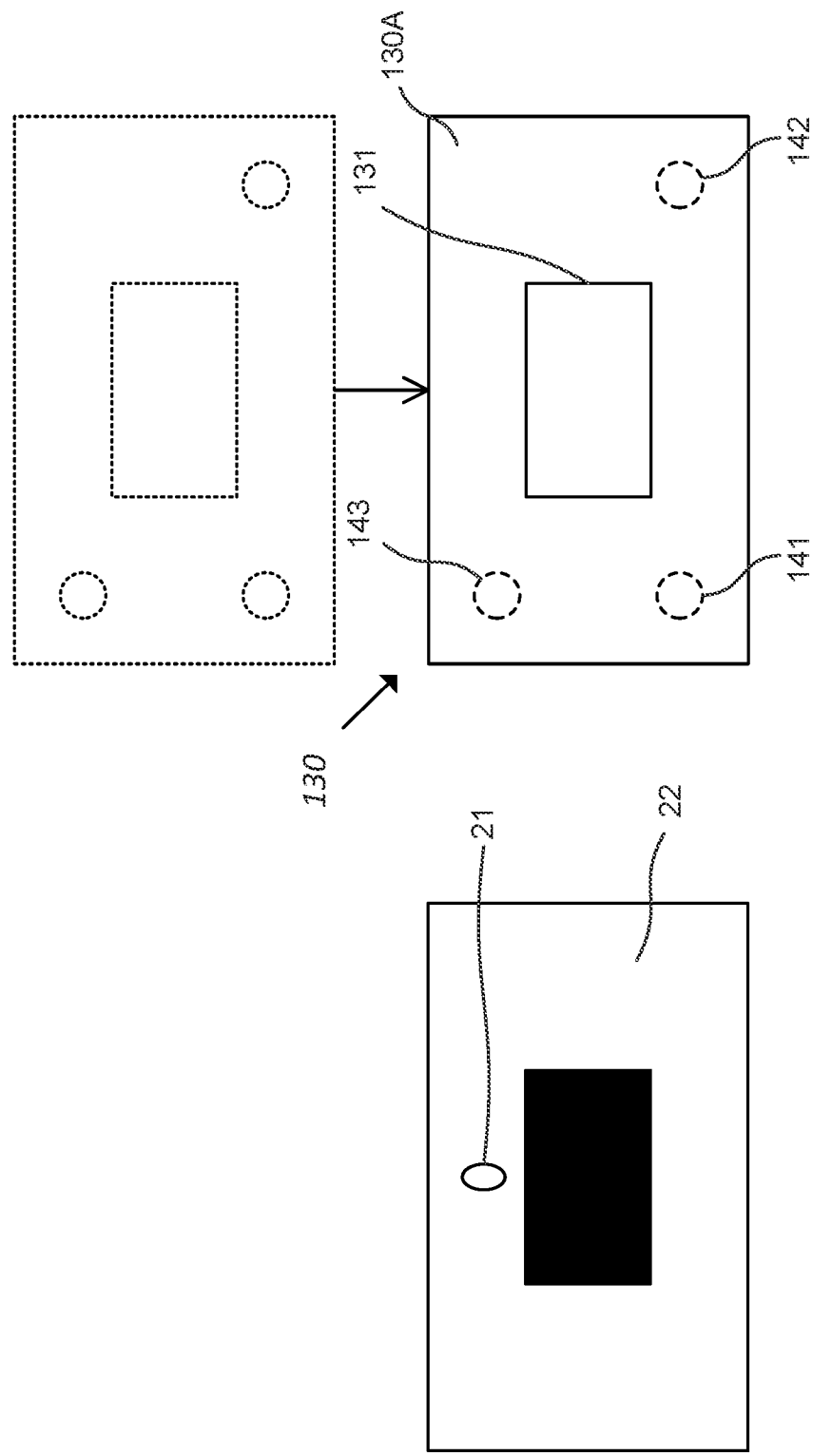

ULTRASONIC CHARGE PORT DETECTOR

TECHNICAL FIELD

This disclosure relates to generally to object detection, and more specifically to charge port detection using ultrasonic sensors.

BACKGROUND

Electrically driven appliances and machines, such as electric vehicles, may include an internal energy source that requires recharging from an external energy source. Low-cost and reliable ways to detect charge port locations on electrically driven appliances and machines may facilitate their use.

SUMMARY

This disclosure relates to ultrasonic charge port detectors. A charge port detector system may include a charger arm, a set of ultrasonic sensors carried by the charger arm, and one or more physical processors. The set of ultrasonic sensors may receive ultrasonic signals from one or more ultrasonic emitters of a charging target. Times at which the set of ultrasonic sensors received the ultrasonic signals may be obtained. The charger arm may be moved based on the times at which the set of ultrasonic sensors received the ultrasonic signals. The movement of the charger arm may align the charger arm to a charge port of the charging target.

The charger arm may carry one or more sets of ultrasonic sensors. The charger arm may be movable along a lateral axis, a vertical axis, a longitudinal axis, and/or other directions. A set of ultrasonic sensors may be configured to receive ultrasonic signals from one or more ultrasonic emitters of a charging target. In some implementations, the charging target may include a vehicle and/or other objects. The set of ultrasonic sensors may include multiple ultrasonic sensors. The set of ultrasonic sensors may include a first ultrasonic sensor, a second ultrasonic sensor, a third ultrasonic sensor. Other numbers of ultrasonic sensors are contemplated.

The first, second, and third ultrasonic sensors may be separated from each other by a distance. In some implementations, the first and second ultrasonic sensors may be separated by a lateral distance, and the first and third ultrasonic sensors may be separated by a vertical distance. In some implementations, the set of ultrasonic sensors may be arranged in an L configuration. In some implementations, the set of ultrasonic sensors may be arranged in a reverse L configuration. In some implementations, the set of ultrasonic sensors may be arranged in an upside-down L configuration. In some implementations, the set of ultrasonic sensors may be arranged in a reverse upside-down L configuration.

The set of ultrasonic sensors may generate analog response signals in response to receiving the ultrasonic signals. In some implementations, the analog response signals may be converted to digital response signals via an analog-to-digital converter. In some implementations, the analog-to-digital converter may include a Schmitt trigger.

Physical processor(s) may be configured by machine-readable instructions. Executing the machine-readable instructions may cause the physical processor(s) to facilitate the operation of the charge port detector system. The machine-readable instructions may include one or more computer program components. Computer program components may include one or more of a time component, a movement component, and/or other computer program components.

The time component may be a timer/clock that is configured to obtain times at which the set of ultrasonic sensors received the ultrasonic signals. The time component may obtain times at which the first ultrasonic sensor received the ultrasonic signals, the times at which the second ultrasonic sensor received the ultrasonic signals, and the times at which the third ultrasonic sensor received the ultrasonic signals.

The movement component may be an actuator that is configured to effectuate the movement of the charger arm. The charger arm may be moved based on the times at which the set of ultrasonic sensors received the ultrasonic signals. The movement of the charger arm may align the charger arm to a charge port of the charging target.

In some implementations, effectuating movement of the charger arm based on the times at which the set of ultrasonic sensors received the ultrasonic signals may include: (1) comparing the times at which the set of ultrasonic sensors received the ultrasonic signals; (2) determining which of the first ultrasonic sensor, the second ultrasonic sensor, and the third ultrasonic first received the ultrasonic signals; and (3) effectuating the movement of the charger arm in a direction of at least one of the first ultrasonic sensor, the second ultrasonic sensor, and the third ultrasonic sensor that first received the ultrasonic signals.

In some implementations, effectuating the movement of the charger arm based on the times at which the set of ultrasonic sensors received the ultrasonic signals may include (1) effectuating the movement of the charger arm along the lateral axis based on the times at which the first ultrasonic sensor and the second ultrasonic sensor received the ultrasonic signals; and (2) effectuating the movement of the charger arm along the vertical axis based on the times at which the first ultrasonic sensor and the third ultrasonic sensor received the ultrasonic signals.

In some implementations, effectuating the movement of the charger arm based on the times at which the set of ultrasonic sensors received the ultrasonic signals may include (1) determining a distance to the ultrasonic emitter based on the times at which the set of ultrasonic sensors received the ultrasonic signals; and (2) effectuating the movement of the charger arm based on the distance to the ultrasonic emitter.

In some implementations, effectuating the movement of the charger arm based on the times at which the set of ultrasonic sensors received the ultrasonic signals may include (1) determining a relative location of the charge port relative to the charger arm; and (2) effectuating the movement of the charger arm based on the relative location.

In some implementations, the movement component may be further configured to effectuate the movement of the charger arm along the longitudinal axis. The charger arm may be moved along the longitudinal axis based on the times at which the set of ultrasonic sensors received the ultrasonic signals. The movement of the charger arm along the longitudinal axis may mate the charger arm with the charge port of the charging target.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

FIGS. 6A-6D illustrate exemplary movements of a charger arm in accordance with some implementations of the disclosure.

DETAILED DESCRIPTION

Figure 1:
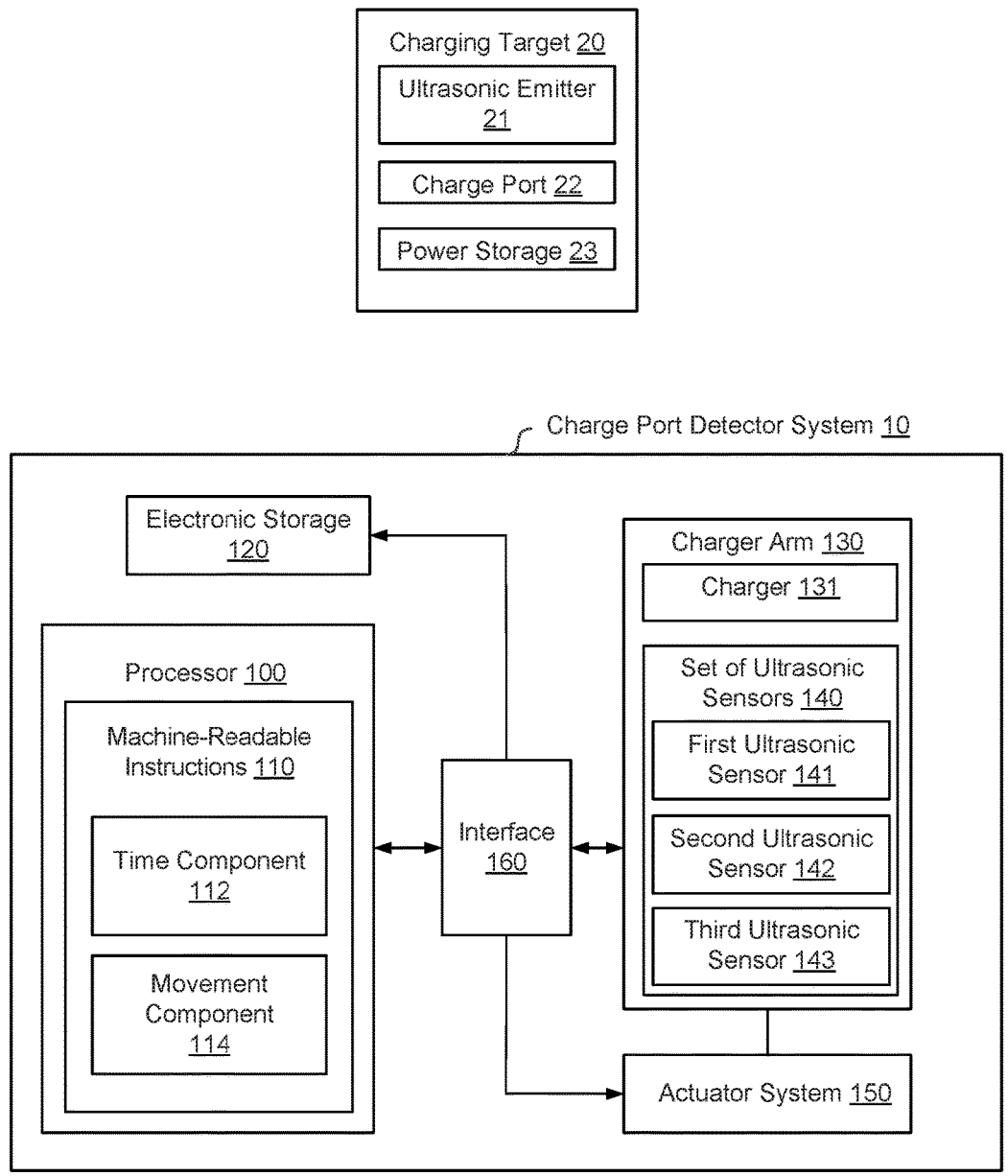
FIG. 1 illustrates a block diagram of a charge port detector system and a charging target in accordance with some implementations of the disclosure.

FIG. 1 illustrates exemplary charge port detector system 10 and charging target 20. Charge port detector system 10 may include processor 100, electronic storage 120, charger arm 130, actuator system 150, interface 160 (e.g., bus, wireless interface), and/or other components. Set of ultrasonic sensors 140 may be carried by charger arm 130. Set of ultrasonic sensors 140 may receive ultrasonic signals from one or more ultrasonic emitters of a charging target. For example, set of ultrasonic sensors 140 may receive ultrasonic signals from ultrasonic emitter 21 of charging target 20. Processor 100 may obtain times at which set of ultrasonic sensors 140 received the ultrasonic signals. Charger arm 130 may be moved based on the times at which set of ultrasonic sensors 140 received the ultrasonic signals. The movement of charger arm 130 may align charger arm 130 to charge port 22 of charging target 20. One or more components of charge port detector system 10 may be configured to perform method 200 described below with reference to FIG. 2.

Charging target 20 may refer to any system that may be charged or recharged, e.g., a device including a rechargeable battery. In some exemplary embodiments, charging target 20 may include a vehicle and/or other objects. The vehicle may have any body style of an automobile, such as a sports car, a coupe, a sedan, a pick-up truck, a station wagon, a sports utility vehicle, a minivan, a race car, a conversion van, or other body styles. The vehicle may also embody other types of transportation, such as motorcycles, boats, buses, trains, planes, or other vehicles. The vehicle may include an electric vehicle, a fuel cell vehicle, a hybrid vehicle, or a conventional internal combustion engine vehicle. The vehicle may be operable by a driver occupying the vehicle, remotely controlled, and/or autonomous.

Charging target 20 may include one or more ultrasonic emitters (e.g., ultrasonic emitter 21), charge port 22, power storage 23, and/or other components. Charge port 22 may be configured to receive charger 131 to charge/recharge power storage 23, e.g., a battery. For example, charging target 20 may be an electric vehicle that recharges its batteries through charge port 22.

Charger arm 130 may carry one or more ultrasonic sensors. Charger arm 130 may carry set of ultrasonic sensors 140 and/or other ultrasonic sensors. Set of ultrasonic sensors 140 may be configured to receive ultrasonic signals from one or more ultrasonic emitters (e.g., ultrasonic emitter 21) of charging target 20. Set of ultrasonic sensors 140 may include multiple ultrasonic sensors. Set of ultrasonic sensors 140 may include first ultrasonic sensor 141, second ultrasonic sensor 142, third ultrasonic sensor 142. Other numbers of ultrasonic sensors are contemplated.

Figure 3A:
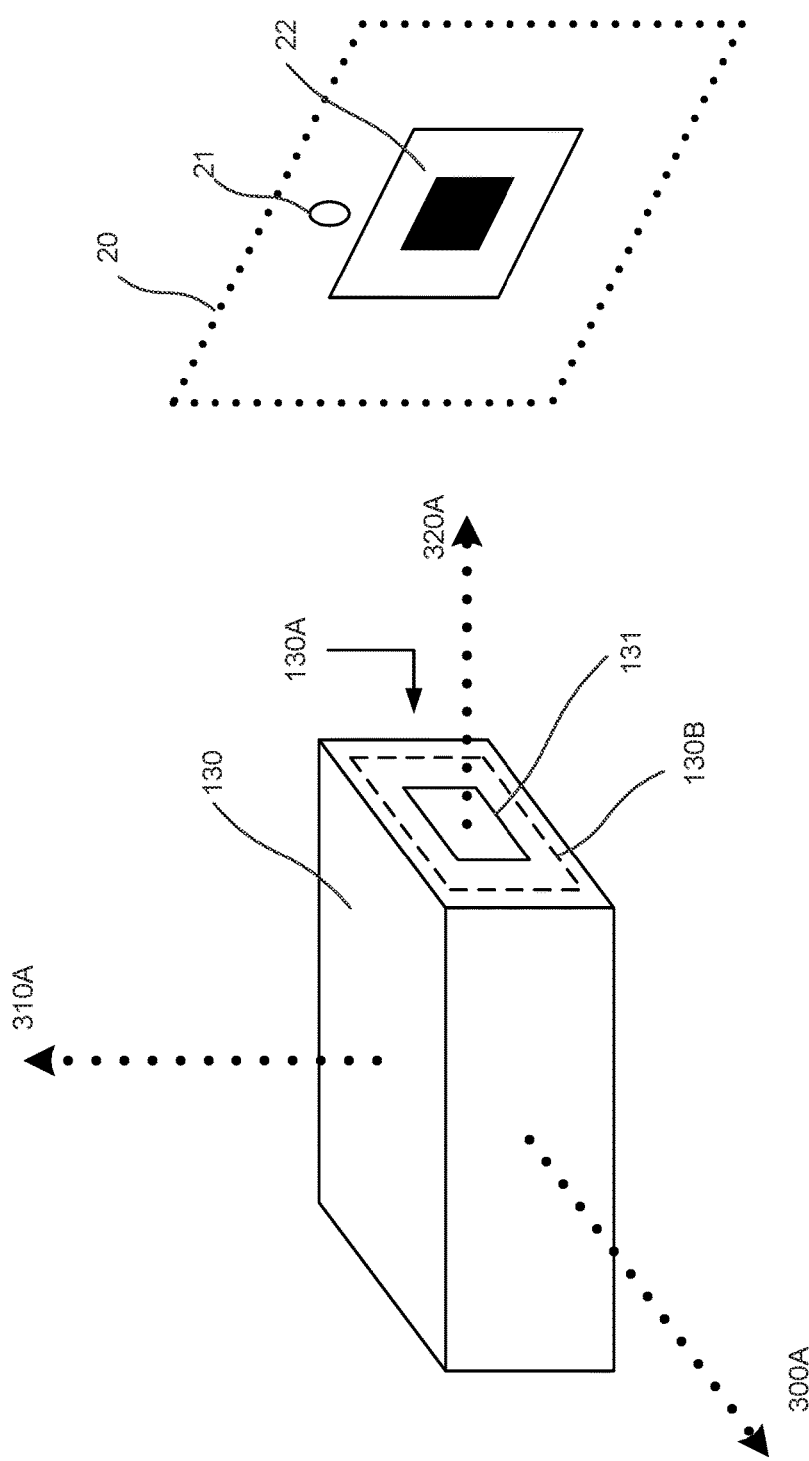
FIGS. 3A-3B illustrate exemplary charger arm and charge port in accordance with some implementations of the disclosure.

Set of ultrasonic sensors 140 may be located in one or more parts of charger arm 130. FIG. 3A illustrates exemplary charger arm 130 and charge port 22 in accordance with some implementations of the disclosure. Charger arm 130 may include charging end 130A. Charging end 130A may include charger 131 configured to mate with charge port 22 of charging target 20. Set of ultrasonic sensors 140 may be disposed on, partially inside, or within charging end 130A of charger arm 130. For example, charging end 130A may include face plate 130B and set of ultrasonic sensors 140 may be positioned on face plate 130B. Other locations of ultrasonic sensors 140 are contemplated.

First ultrasonic sensor 141, second ultrasonic sensor 142, and third ultrasonic sensor 142 may be separated from each other by a distance. In some exemplary implementations, first ultrasonic sensor 141 and second ultrasonic sensor 142 may be separated by a lateral distance when charger arm 130 is leveled with respect to ground, and first ultrasonic sensor 141 and third ultrasonic sensor 143 may be separated by a vertical distance when charger arm 130 is leveled with respect to ground.

Figure 4A:
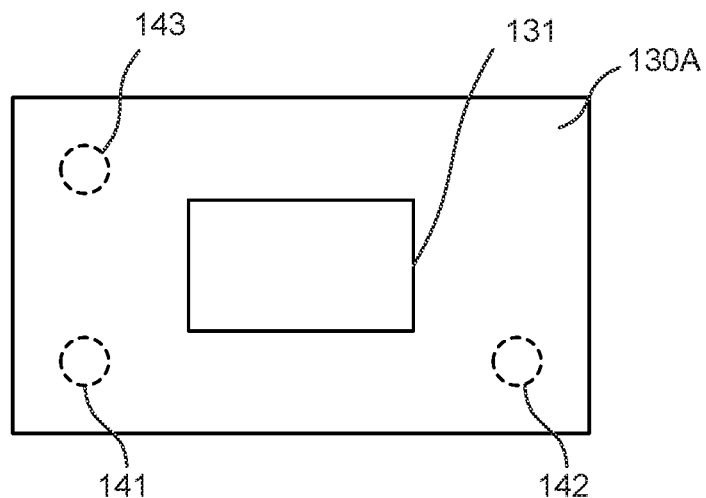
FIGS. 4A-4D illustrate exemplary configurations for ultrasonic sensors in accordance with some implementations of the disclosure.

In some exemplary implementations, set of ultrasonic sensors 140 may be arranged in an L configuration. As shown in FIG. 4A, first ultrasonic sensor 141 may be located at lower left portion of charging end 130A, second ultrasonic sensor 142 may be located at lower right portion of charging end 130A, and third ultrasonic sensor 143 may be located at upper left portion of charging end 130A. The distance between first ultrasonic sensor 141 and second ultrasonic sensor 142 may be greater than the distance between first ultrasonic sensor 141 and third ultrasonic sensor 143. Charger 131 may be located at middle of charging end 130A. Other L configurations of set of ultrasonic sensors 140 are contemplated.

Figure 4B:
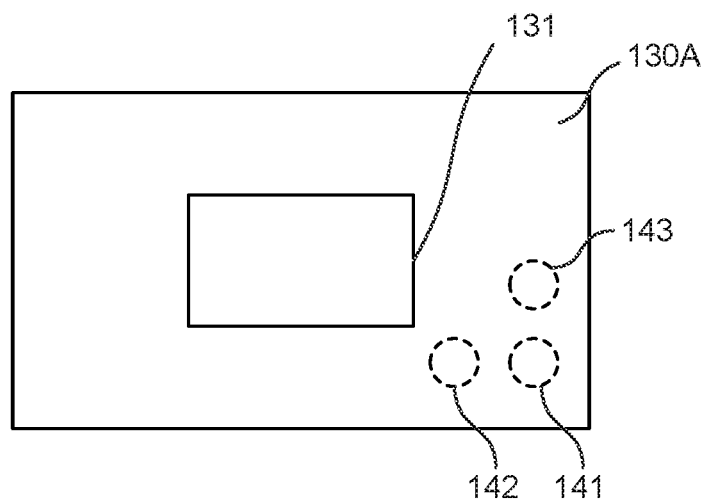

In some exemplary implementations, set of ultrasonic sensors 140 may be arranged in a reverse L configuration. As shown in FIG. 4B, first ultrasonic sensor 141, second ultrasonic sensor 142, and third ultrasonic sensor 143 may be located at lower right portion of charging end 130A. The distance between first ultrasonic sensor 141 and second ultrasonic sensor 142 may be the same as the distance between first ultrasonic sensor 141 and third ultrasonic sensor 143. Charger 131 may be located at middle of charging end 130A. Other reverse L configurations of set of ultrasonic sensors 140 are contemplated.

Figure 4C:
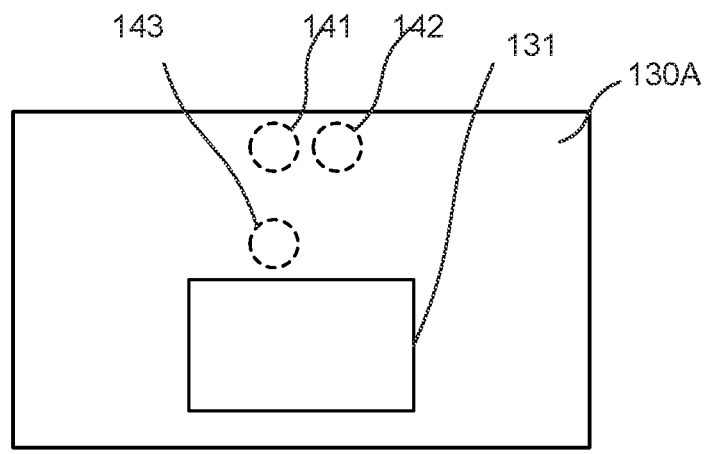

In some exemplary implementations, set of ultrasonic sensors 140 may be arranged in an upside-down L configuration. As shown in FIG. 4C, first ultrasonic sensor 141, second ultrasonic sensor 142, and third ultrasonic sensor 143 may be located above middle of charging end 130A. The distance between first ultrasonic sensor 141 and second ultrasonic sensor 142 may be smaller than the distance between first ultrasonic sensor 141 and third ultrasonic sensor 143. Charger 131 may be located below middle of charging end 130A. Other upside-down L configurations of set of ultrasonic sensors 140 are contemplated.

Figure 4D:
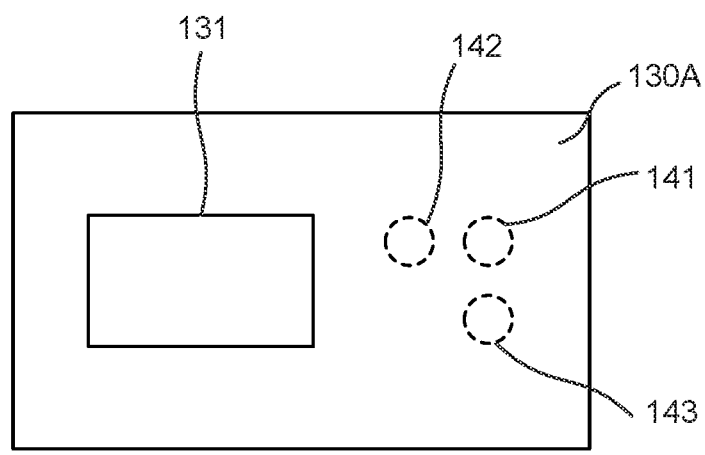

In some implementations, set of ultrasonic sensors 140 may be arranged in a reverse upside-down L configuration. As shown in FIG. 4D, first ultrasonic sensor 141, second ultrasonic sensor 142, and third ultrasonic sensor 143 may be located to the right of middle of charging end 130A. The distance between first ultrasonic sensor 141 and second ultrasonic sensor 142 may be the same as the distance between first ultrasonic sensor 141 and third ultrasonic sensor 143. Charger 131 may be located to the left of middle of charging end 130A. Other reverse upside-down L configurations of set of ultrasonic sensors 140 are contemplated. Other locations and configurations of charger 131 and set of ultrasonic sensors 140 are contemplated.

Exemplary configurations of set of ultrasonic sensors 140 shown in FIGS. 4A-4D may provide for low-cost and reliable ways of aligning charger arm 130 to charge port 22 of charging target 20. Exemplary configurations of set of ultrasonic sensors 140 shown in FIGS. 4A-4D may allow for use of simple algorithms to align charger arm 130 to charge port 22. Readings from laterally arranged ultrasonic sensors (first ultrasonic sensor 141 and second ultrasonic sensor 142) may be used to align charger arm 130 to charge port 22 in a lateral direction. Readings from vertically arranged ultrasonic sensors (first ultrasonic sensor 141 and third ultrasonic sensor 143) may be used to align charger arm 130 to charge port 22 in a vertical direction.

Readings from set of ultrasonic sensors 140 may be used to move charger arm 130 towards charge port 22 by moving charger arm 130 in a direction of one or more ultrasonic sensors 141, 142, 143 that first received ultrasonic signals from ultrasonic emitter 21 of charging target 20. For example, first ultrasonic sensor 141, second ultrasonic sensor 142, third ultrasonic sensor 143, and/or other ultrasonic sensors may trigger an interrupt to processor 100 based on reception of ultrasonic signals from ultrasonic emitter 21. Based on timing of the interrupts, processor 100 may determine which of ultrasonic sensors 141, 142, 143 first received the ultrasonic signals and effectuate the movement of charger arm 130 in the direction of the ultrasonic sensor(s) 141, 142, 143 that first received the ultrasonic signal. Movement of charger arm 130 may change when another ultrasonic sensor 141, 142, 143 first receives the ultrasonic signals. Other algorithms for aligning charger arm 130 to charge port 22 are contemplated.

Movement of charger arm 130 may take into account one or more distance offsets depending on the configurations of set of ultrasonic sensors 140 and/or charger 131 on charger arm 130, and the configurations of ultrasonic emitter 21 and charge port 22 on charging target 20. For example, processor 100 may effectuate movement of charger arm 130 shown in FIG. 4C different than movement of charger arm 130 shown in FIG. 4D to account for different locations of set of ultrasonic sensors 140 and charger 131 on charging end 130A.

Charger arm 130 may be movable in one or more directions. Movements of charger arm 130 may include translational motion and/or rotational motion. In some exemplary implementations, charger arm 130 may be moveable along a lateral axis, a vertical axis, a longitudinal axis, and/or other directions. Charger arm 130 may be movable along one or more axes in sequence and/or at the same time.

Figure 3B:
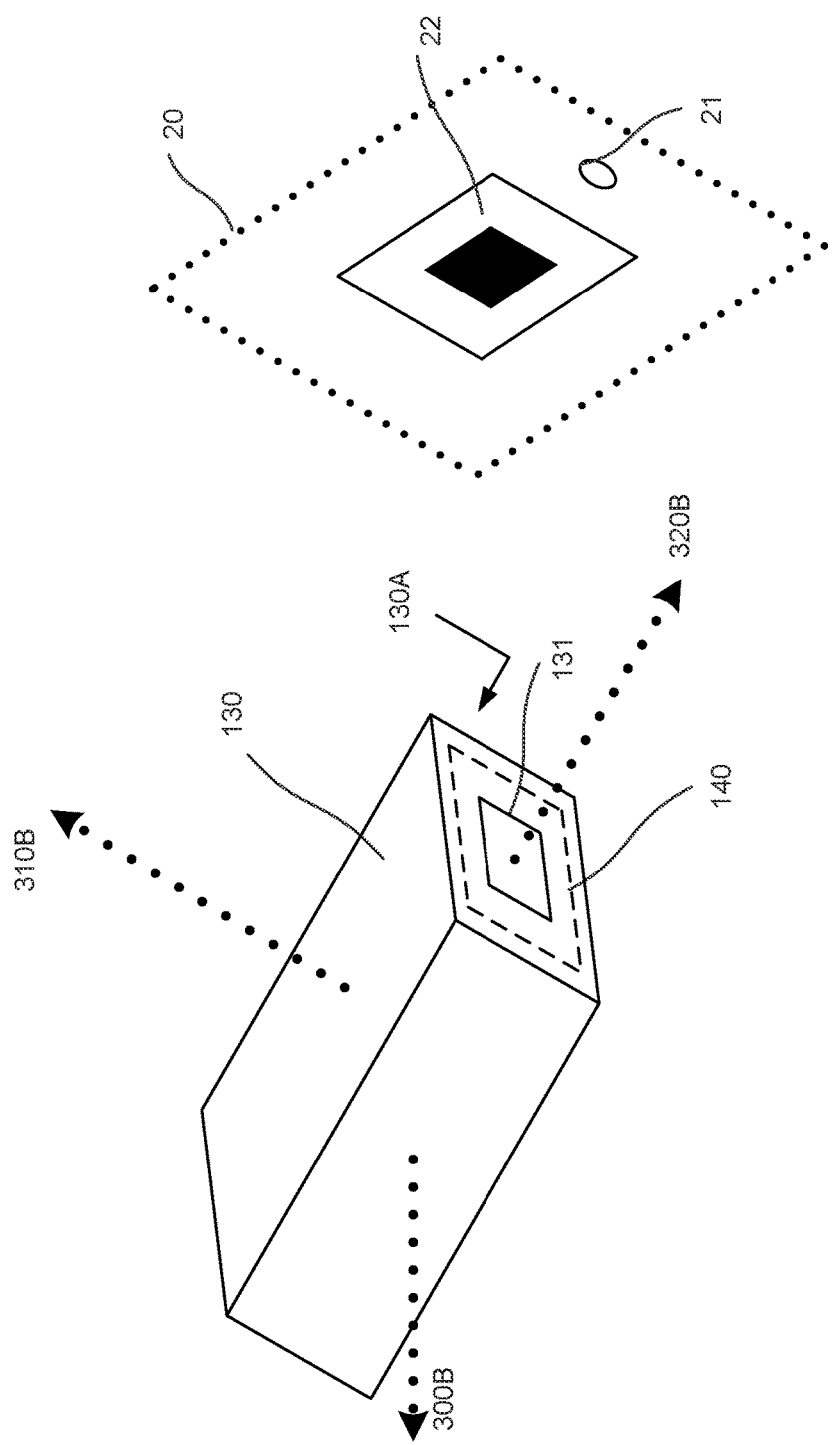

FIGS. 3A-3B illustrate exemplary movements of charger arm 130 with respect to charge port 22. In FIG. 3A, charger arm 130 may be leveled with respect to ground. Charger arm 130 may be moveable along lateral axis 300A, vertical axis 310A, longitudinal axis 320A, and/or other directions. In some exemplary implementations, charger arm 130 may be rotatable along lateral axis 300A, vertical axis 310A, longitudinal axis 320A, and/or other directions. In FIG. 3B, charger arm 130 may be tilted with respect to ground. The tilt of charger arm 130 may match tilt of charge port 22 on charging target 20. Charger arm 130 may be moveable along lateral axis 300B, vertical axis 310B, longitudinal axis 320B, and/or other directions. In some exemplary implementations, charger arm 130 may be rotatable along lateral axis 300B, vertical axis 310B, longitudinal axis 320B, and/or other directions.

Movements of charger arm 130 along one or more directions may align charger arm 130 to charge port 22. Aligning charger arm 130 to charge port 22 may include aligning charger 131 to charge port 22. Charger arm 130 may move along one or more of lateral axis 300A, 300B, vertical axis 310A, 310B, longitudinal axis 320A, 320B, and/or other directions to align charger 131 to charge port 22. Movement of charger arm 130 may take into account locations of set of ultrasonic sensors 140 and charger 131 on charger arm 130, and locations of ultrasonic emitter 21 and charge port 22 on charging target 20.

Charger arm 130 may be attached to, supported by, and/or carried by actuator system 150. Actuator system 150 may facilitate movement of charger arm 130 in one or more directions. Actuator system 150 may include one or more of a motor, an arm, a hinge, a movable base (e.g., a support platform that can move across a surface), a fixed base (e.g., a support platform attached to an object, such as a wall, a ceiling, a pillar, a ground, or other structures) and/or other components to move charger arm 130. In some exemplary implementations, actuator system 150 may include one or more snake-arm robots to move charger arm 130 in one or more directions.

Figure 5:
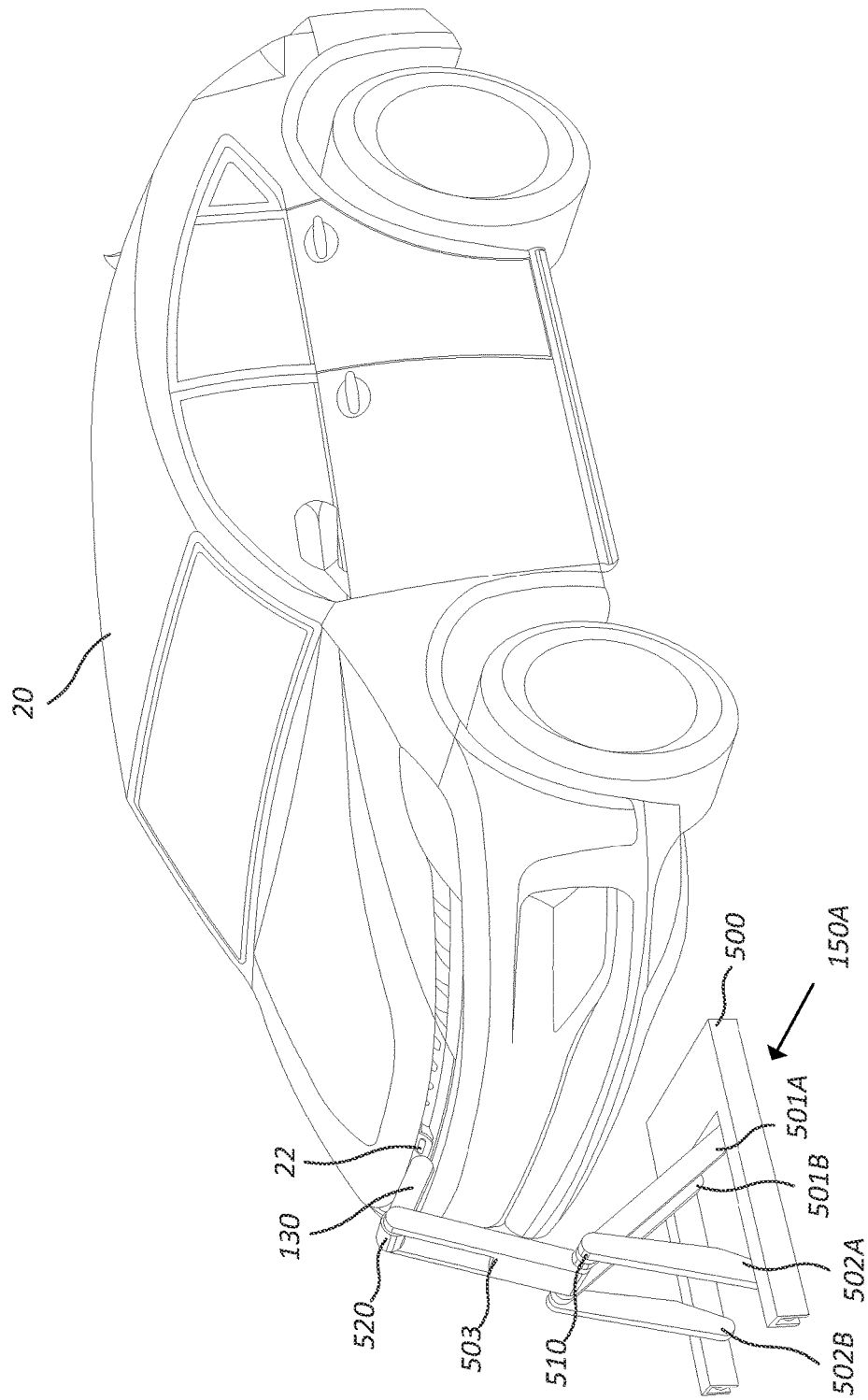
FIG. 5. illustrates an exemplary actuator system for a charging arm in accordance with some implementations of the disclosure.

In some exemplary implementations, actuator system 150 may include movable platform 150A shown in FIG. 5. Movable platform 150A may include movable base 500 including one or more wheels, tracks, levitation devices, and/or other mechanics configured to move movable base 500. One or more of set of lower arms 501A, 501B, 502A, 502B may be attached to movable base 500. Upper arm 503 may be attached to one or more of set of lower arms 501A, 501B. Charger arm 130 may be attached to upper arm 503. Movable platform 150A may include one or more motors that allow one or more components of movable platform 150A to rotate. For example, movable platform 150A may include one or more motors that allow upper arm 503 to rotate about hinge 510 and charger arm 130 to rotate about hinge 520. Movements of movable platform 1510A may align charger arm 130 to charging port 22 of charging target 20 (e.g., electric vehicle). Other types of actuator system 150 are contemplated.

Electronic storage 120 may include electronic storage medium that electronically stores information. Electronic storage 120 may store software algorithms, information determined by processor 100, information received remotely, and/or other information that enables system 10 to function properly. For example, electronic storage 120 may store information relating to charging target 20, ultrasonic emitter 21, charge port 22, charger arm 130, charger 131, set of ultrasonic sensors 140, actuator system 150, distances between different components, relative positions of different components, orientation of different components, relative orientations of different components, and/or other information.

Processor 100 may be configured to provide information processing capabilities in system 10. As such, processor 100 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 100 may be configured to execute one or more machine readable instructions 110 to facilitate ultrasonic charge port detection. Machine-readable instructions 110 may include one or more computer program components. Machine readable instructions 110 may include one or more of time component 112, movement component 114, and/or other computer program components.

Time component 112 may be a timer/clock that is configured to obtain times at which set of ultrasonic sensors 140 received ultrasonic signals from one or more ultrasonic emitters (e.g., ultrasonic emitter 21) of charging target. Time component 112 may obtain times at which first ultrasonic sensor 141 received the ultrasonic signals, times at which second ultrasonic sensor 142 received the ultrasonic signals, and times at which third ultrasonic sensor 142 received the ultrasonic signals. In response to receiving ultrasonic signals, set of ultrasonic sensors 140 may generate analog response signal and/or digital response signals. In some exemplary implementations, analog response signals from set of ultrasonic sensors 140 may be run through an analog-to-digital converter (e.g., Schmitt trigger) to covert the analog response signals to digital response signals. The times at which set of ultrasonic sensors 140 generate response signals may correspond to times at which set of ultrasonic sensors 140 received the ultrasonic signals. Time component 112 may obtain times at which set of ultrasonic sensors 140 received ultrasonic signals based on the analog response signals and/or digital response signals.

FIGS. 6A-6D illustrate exemplary lateral and vertical distances separating charger arm 130 from charge port 22. FIGS. 7A-7D illustrate exemplary response signals generated by set of ultrasonic sensors 140 in response to receiving ultrasonic signals from ultrasonic emitter 21.

Figure 6A:
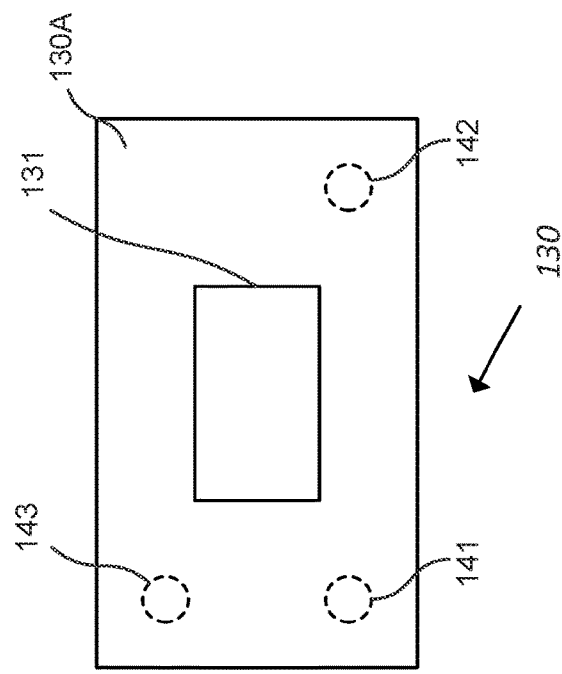
Figure 6A:
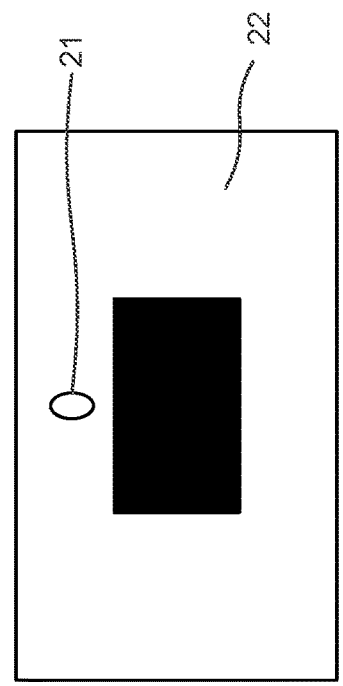

In FIG. 6A, charger arm 130 may be located to the right and above charge port 22. First ultrasonic sensor 141 may be closer to ultrasonic emitter 21 than second ultrasonic sensor 142 and third ultrasonic sensor 143. Third ultrasonic sensor 143 may be closer to ultrasonic emitter 21 than second ultrasonic sensor 142. In response to reception of ultrasonic signals from ultrasonic emitter 21, set of ultrasonic sensors 140 may generate analog response signals 700A shown in FIG. 7A. Based on the proximity of set of ultrasonic sensors 140 to ultrasonic emitter 21, first ultrasonic sensor 141 may firstly generate response signal 741A, third ultrasonic sensor 143 may secondly generate response signal 743A, and second ultrasonic sensor 142 may thirdly generate response signal 742A.

Analog response signals 700A may be converted to digital response signals 750A via use of an analog-to-digital converter (e.g., Schmitt trigger). For example, for values of analog response signals 700A at and/or above 2.8V, the analog-to-digital converter may push the value of digital response signals 750 to 5V. Sampling digital response signals 750A may be quicker than sampling analog response signals 700A, and conversion of analog response signals 700A to digital response signals 750A may provide for quicker response times in aligning charger arm 130 to charge port 22.

Movement component 114 may be an actuator that is configured to effectuate the movement of charger arm 130. Charger arm 130 may be moved based on the times at which set of ultrasonic sensors 140 received the ultrasonic signals. The times at which set of ultrasonic sensors 140 received the ultrasonic signals may indicate distances between ultrasonic emitter 21 and individual ultrasonic sensors 141, 142, 143. Based on the distances between ultrasonic emitter 21 and individual ultrasonic sensors 141, 142, 143, relative position of charger arm 130 to charge port 22 may be determined. Charger arm 130 may be moved based on the relative position of charger arm 130 to charge port 22, and the movement of charger arm 130 may align charger arm 130 to charge port 22 of charging target 20.

In some exemplary implementations, charger arm 130 may be moved by: (1) comparing the times at which set of ultrasonic sensors 140 received the ultrasonic signals; (2) determining which of set of ultrasonic sensors 140 first received the ultrasonic signals; and (3) moving charger arm 130 in a direction of at least one of first ultrasonic sensor 141, second ultrasonic sensor 142, and/or third ultrasonic sensor 143 that first received the ultrasonic signals. For example, referring to FIGS. 6A and 7A, charger arm 130 may be moved in the direction of first ultrasonic sensor 141 (down and to the left) based on first ultrasonic sensor 141 receiving the ultrasonic signals before second ultrasonic sensor 142 and third ultrasonic sensor 143. Charger arm 130 may in the direction of first ultrasonic sensor 141 until second ultrasonic sensor 142 or third ultrasonic sensor 143 first receives the ultrasonic signals.

In some exemplary implementations, charger arm 130 may be moved by (1) moving charger arm 130 along lateral axis 300A, 300B based on the times at which first ultrasonic sensor 141 and second ultrasonic sensor 142 received the ultrasonic signals; and (2) moving charger arm 130 along vertical axis 310A, 310B based on the times at which first ultrasonic sensor 141 and third ultrasonic sensor 143 received the ultrasonic signals.

Figure 7A:
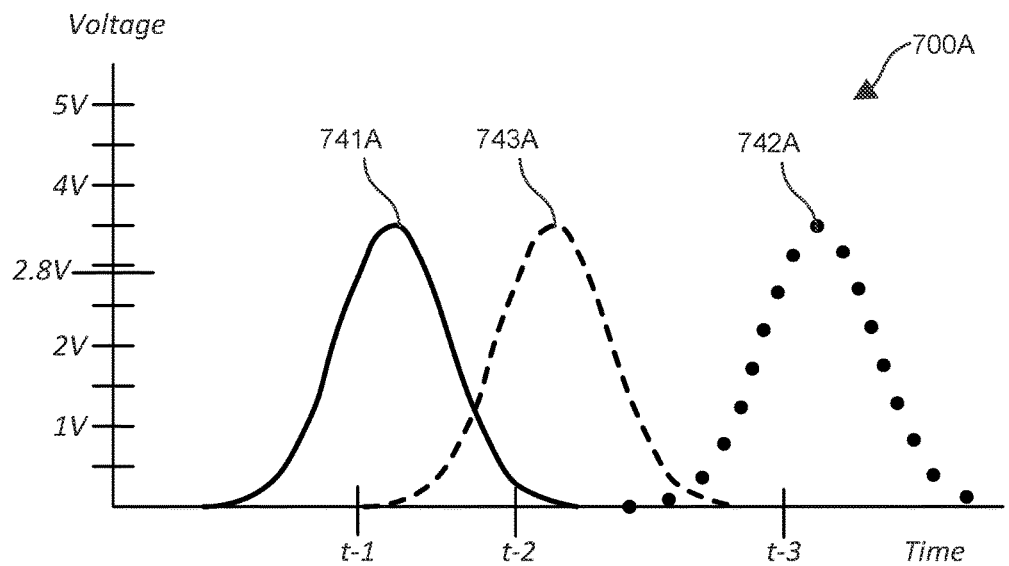
FIGS. 7A-7D illustrate exemplary readings from ultrasonic sensors in accordance with some implementations of the disclosure.
Figure 7A:
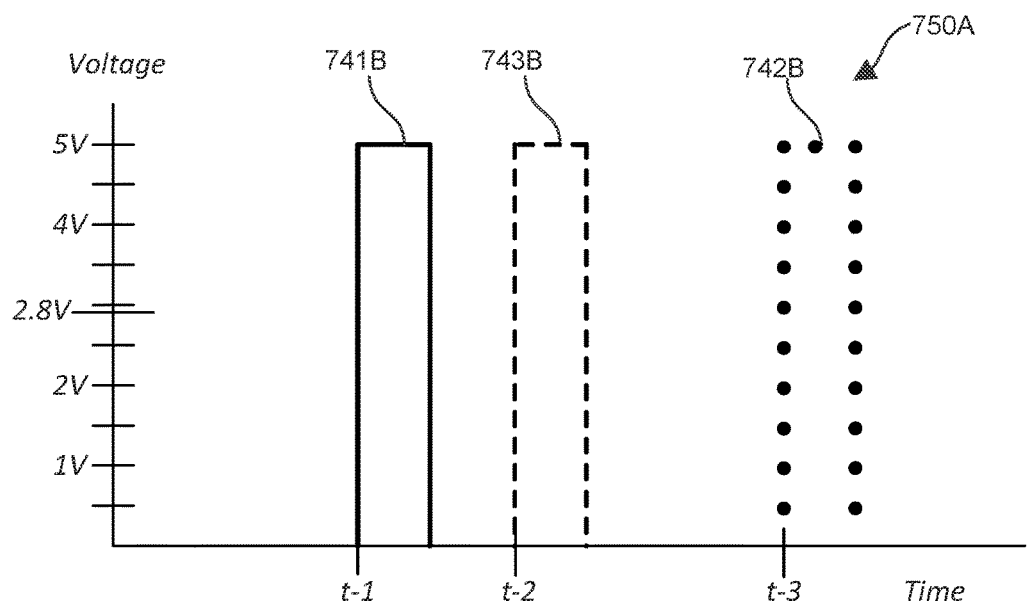
Figure 7B:
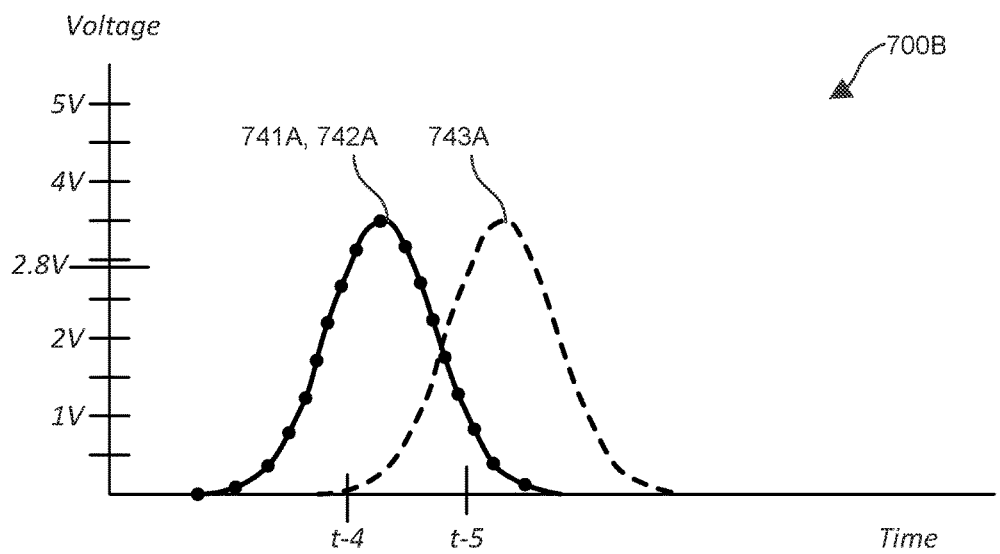
Figure 7B:
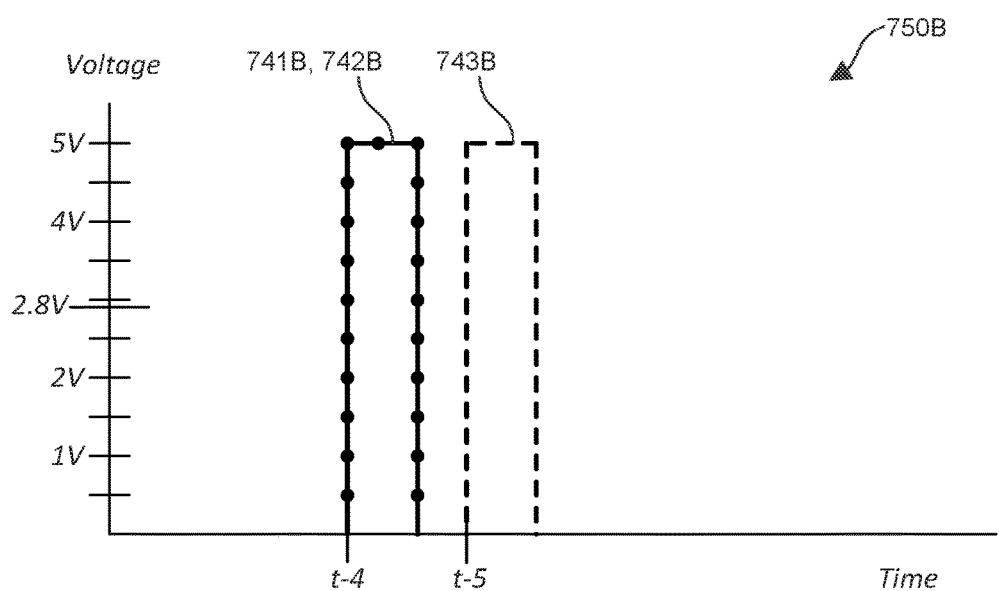

For example, charger arm 130 positioned with respect to charge port 22 as shown in FIG. 6A may be moved to the left (as shown in FIG. 6B) based on first ultrasonic sensor 141 receiving the ultrasonic signals before second ultrasonic sensor 142. In some implementations, charger arm 130 may stop moving to the left when analog/digital response signals 700B, 750B (shown in FIG. 7B) generated by set of ultrasonic sensors 140 indicate that charge port 22 is positioned in the middle of first ultrasonic sensor 141 and second ultrasonic sensor 142 (as shown in FIG. 6B). For example, movement component 114 may determine that charge port 22 is positioned in the middle of first ultrasonic sensor 141 and second ultrasonic sensor 142 when first ultrasonic sensor 141 and second ultrasonic sensor 142 generate response signals 741A and 742A and/or 741B and 742B at the same time (as shown in FIG. 7B)

Charger arm 130 positioned with respect to charge port 22 as shown in FIG. 6A may be moved down (as shown in FIG. 6D) based on first ultrasonic sensor 141 receiving the ultrasonic signals before third ultrasonic sensor 143. In some implementations, charger arm 130 may stop moving downward when analog/digital response signals 700D, 750D (shown in FIG. 7D) generated by set of ultrasonic sensors 140 indicate that charge port 22 is positioned in the middle of first ultrasonic sensor 141 and third ultrasonic sensor 143

Figure 7C:
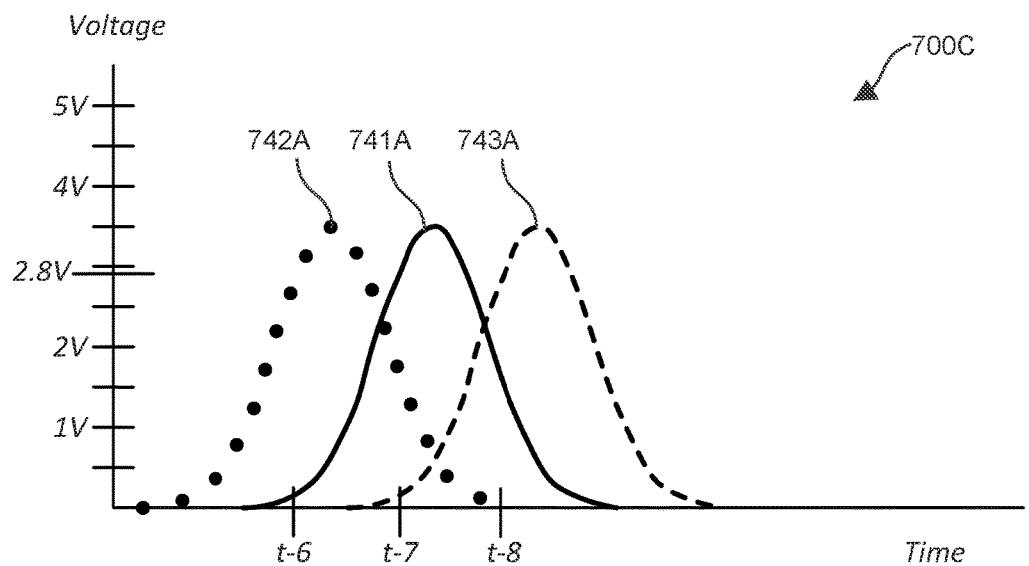
Figure 7C:
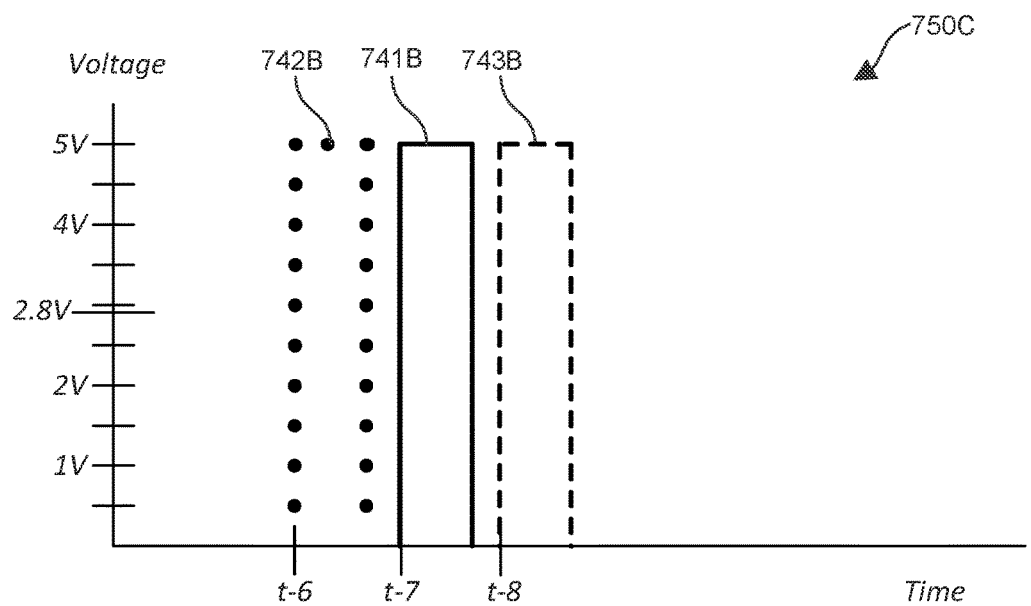
Figure 7D:
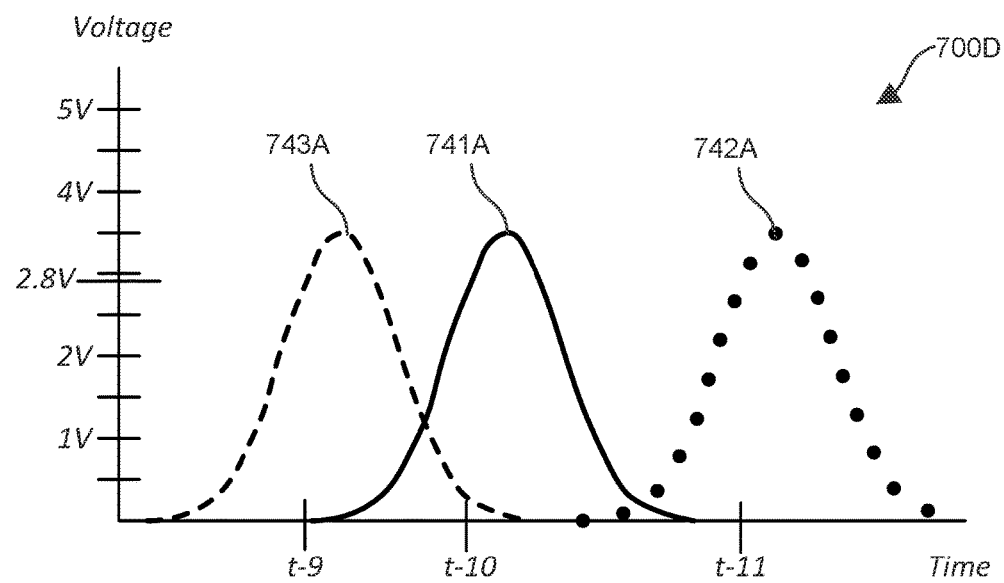
Figure 7D:
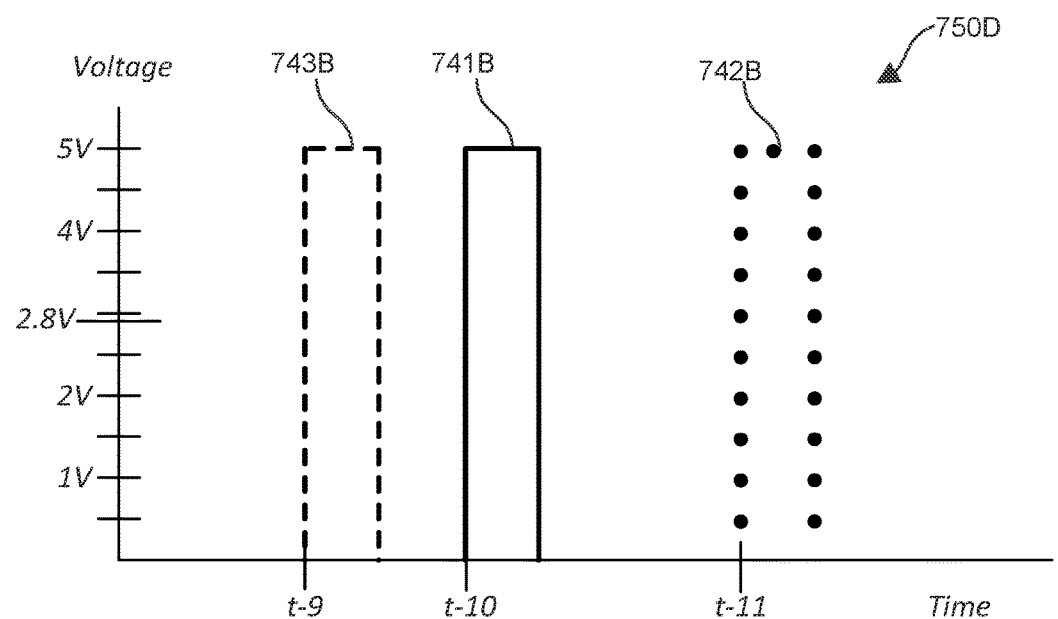

(as shown in FIG. 6D). For example, movement component 114 may determine that charge port 22 is positioned in the middle of first ultrasonic sensor 141 and third ultrasonic sensor 143 when first ultrasonic sensor 141 generate response signals 741A, 741B and third ultrasonic sensor 143 generate response signals 743A, 743B spaced apart by a particular time interval (as shown in FIG. 7D). The particular time interval may depend on the distance between set of ultrasonic sensors 140 and ultrasonic emitter 21/charge port 22.

In some implementations, charger arm 130 may move past an alignment position and may back track to the alignment position. For example, charger arm 130 positioned with respect to charge port 22 as shown in FIG. 6A may be moved to the left based on first ultrasonic sensor 141 receiving the ultrasonic signals before second ultrasonic sensor 142. Charger arm 130 may move past a lateral alignment position (in which charger 131 is laterally aligned with charge port 22) as shown in FIG. 6C. Charger arm 130 may back track to the lateral alignment position (e.g., moving to the right in FIG. 6C) when analog/digital response signals 700C, 750C (shown in FIG. 7C) generated by set of ultrasonic sensors 140 indicate that charge port 22 has moved past the lateral alignment position. For example, movement component 114 may determine that charge port 22 has moved too far to the left when second ultrasonic sensor 142 generates response signals 742A, 742B before first ultrasonic sensor 141 generates response signals 741A, 741B (as shown in FIG. 7C).

In some exemplary implementations, charger arm 130 may be moved by (1) determining one or more distances to ultrasonic emitter 21 based on the times at which set of ultrasonic sensors 140 received the ultrasonic signals; and (2) moving charger arm 130 based on the distance(s). Based on the speed with which ultrasonic signals travel between ultrasonic emitter 21 and set of ultrasonic sensors 140 and times at which set of ultrasonic sensors 140 received the ultrasonic signals, movement component 114 may calculate a distance between set of ultrasonic sensors 140 and ultrasonic emitter 21 and/or distances between first ultrasonic sensor 141, second ultrasonic sensor 142, and third ultrasonic sensor 143 and ultrasonic emitter 21. Movement component 114 may determine one or more distances between charge port 22 and charger arm 130 (and/or charger 131) based on the distance(s) between ultrasonic emitter 21 and set of ultrasonic sensors 140/first ultrasonic sensor 141, second ultrasonic sensor 142, and third ultrasonic sensor 143. Movement component 114 may effectuate movement of charger arm 150 based on one or more distances.

In some exemplary implementations, charger arm 130 may be moved by (1) determining a relative location of charge port 22 relative to charger arm 130 (and/or charger 131); and (2) moving charger arm 130 based on the relative location. Based on the speed with which ultrasonic signals travel between ultrasonic emitter 21 and set of ultrasonic sensors 140 and times at which set of ultrasonic sensors 140 received the ultrasonic signals, movement component 114 may calculate a relative distance and a relative orientation between set of ultrasonic sensors 140 and ultrasonic emitter 21 and/or relative distances and relative orientations between first ultrasonic sensor 141, second ultrasonic sensor 142, and third ultrasonic sensor 143 and ultrasonic emitter 21. Movement component 114 may determine one or more relative distances and relative orientations between charge port 22 and charger arm 130 (and/or charger 131) based on the relative distance(s) and relative orientation(s) between ultrasonic emitter 21 and set of ultrasonic sensors 140/first ultrasonic sensor 141, second ultrasonic sensor 142, and third ultrasonic sensor 143. Movement component 114 may effectuate movement of charger arm 150 based on one or more relative distances and relative orientations.

In some implementations, movement component 114 may be further configured to effectuate the movement of charger arm 130 along longitudinal axis 320A, 320B. Charger arm 130 may be moved along longitudinal axis 320A, 320B based on the times at which set of ultrasonic sensors 140 received the ultrasonic signals. Charger arm 130 may be moved along longitudinal axis 320A, 320B when the response signals generated by set of ultrasonic sensors 140 indicate that the charger arm (and/or charger 131) is aligned with charge port 22. The movement of charger arm 130 along longitudinal axis 320A, 320B may mate charger arm 130 with charge port 22 of charging target 20. Mating of charger arm 130 with charge port 22 may deactivate set of ultrasonic sensors 140 and/or actuator system 150 (e.g., motors). When charging of charging target 20 has completed, movement component 114 may effectuate a reverse movement of charger arm 130 along longitudinal axis 320A, 320B to uncouple charger arm (and/or charger 131) from charge port 22.

In some implementations, charger arm 130 may be moved along longitudinal axis 320A, 320B while making lateral and vertical movements to align charger arm 130 to charge port 22. In some implementations, charger arm 130 may move along lateral axis 300A, 300B and/or vertical axis 310A, 310B when charger arm 130 is at certain distance(s) and/or distance range(s) from charge port 22. For example, charger arm 130 may be required to be at a certain distance from charge port 22 to move in lateral, vertical, and/or other directions. Such a requirement may reduce chances that charger arm 130 may accidentally hit charging target 20 while making lateral, vertical, and/or other movements.

In some implementations, the speed with which charger arm 130 is moved along longitudinal axis 320A, 320B may change based on distance(s) and/or distance range(s) between charger arm 130 and charge port 22. For example, charger arm 130 may move with slower speed when charger arm 130 is near charge port 22 than when charger arm 130 is far from charge port 22.

In some implementations, movement component 114 may be further configured to effectuate rotational movements of charger arm 130 along lateral axis 300A, 300B, vertical axis 310A, 310B, longitudinal axis 320A, 320B, and/or other axes. Rotations of charger arm 130 along one or more axes may align charger arm 130 with charge port 22. For example, charger arm 130 shown in FIG. 3A may be rotated about lateral axis 300A so that charger arm 130 is aligned with tilted charge port 22 shown in FIG. 3B. Movement component 114 may effectuate rotational movements of charger arm 130 based on times at which set of ultrasonic sensors 140 and other ultrasonic sensor(s) received ultrasonic signals from multiple ultrasonic emitters.

Figure 8A:
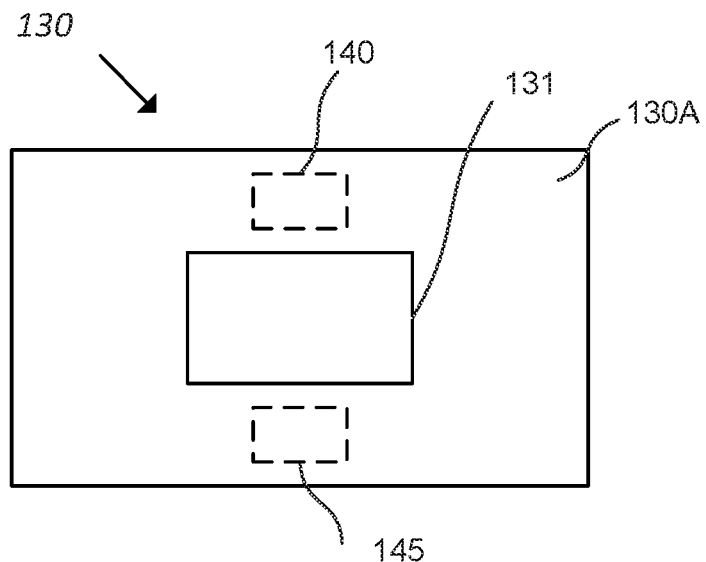
FIGS. 8A-8B illustrate exemplary locations of ultrasonic sensors in accordance with some implementations of the disclosure.
Figure 8B:
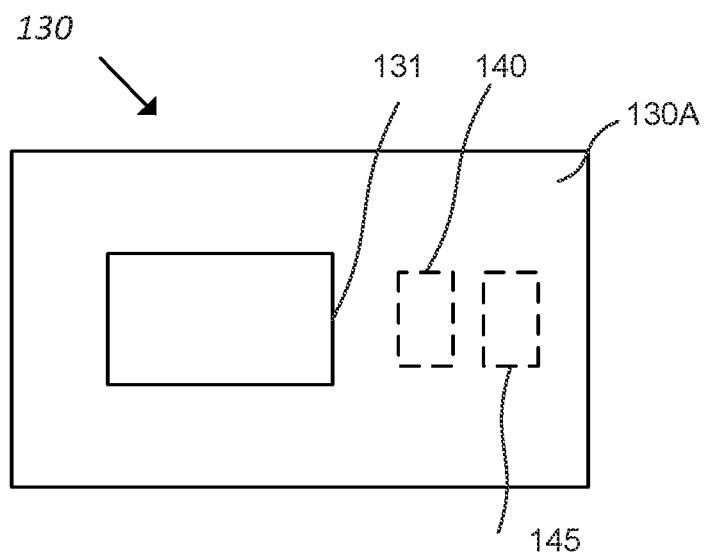

FIGS. 8A-8B illustrate exemplary locations of ultrasonic sensors. In FIG. 8A, charger arm 130 may include set of ultrasonic sensors 140 above charger 131 and other ultrasonic sensor(s) 145 (e.g., single ultrasonic sensor(s), another set of ultrasonic sensors, etc.) below charger 131. In FIG. 8B, charger arm 130 may include set of ultrasonic sensors 140 to the right of charger 131 and other ultrasonic sensor(s) 145 to the right of set of ultrasonic sensors 140.

Figure 9A:
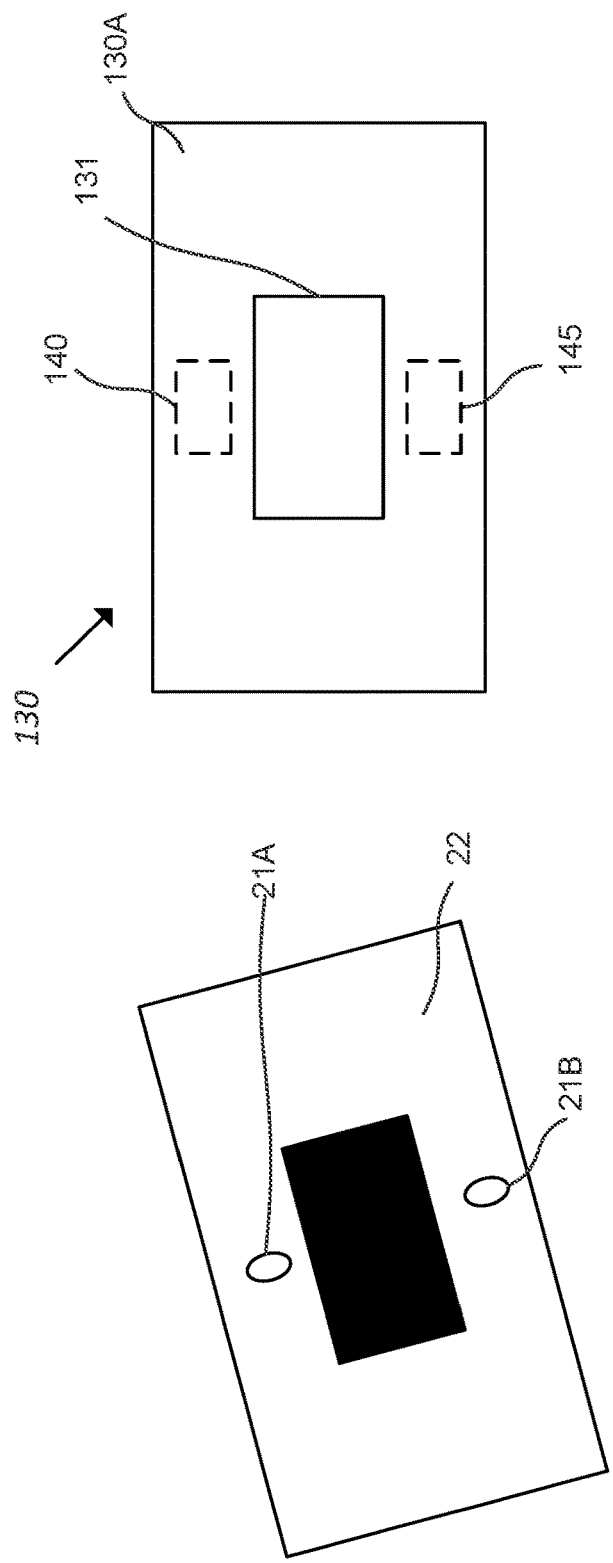
FIGS. 9A-9B illustrate exemplary rotation of a charger arm in accordance with some implementations of the disclosure.
Figure 9B:
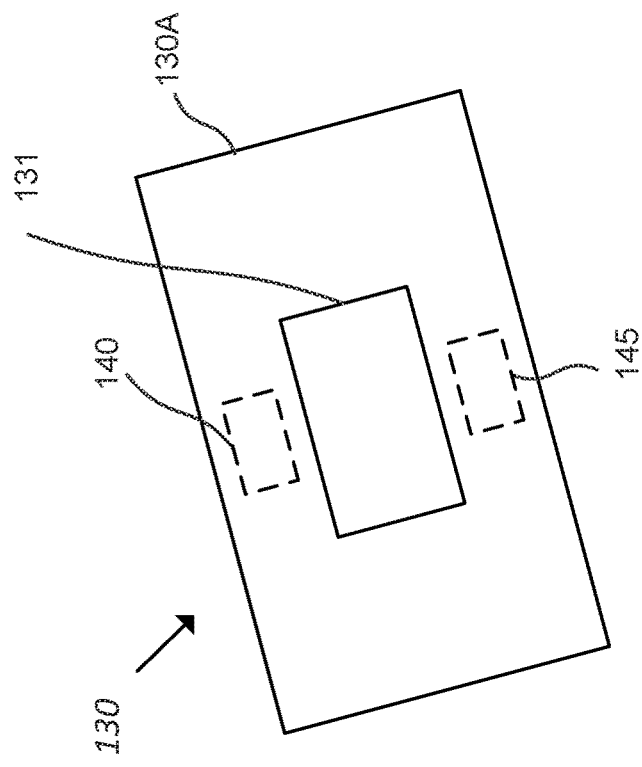
Figure 9B:
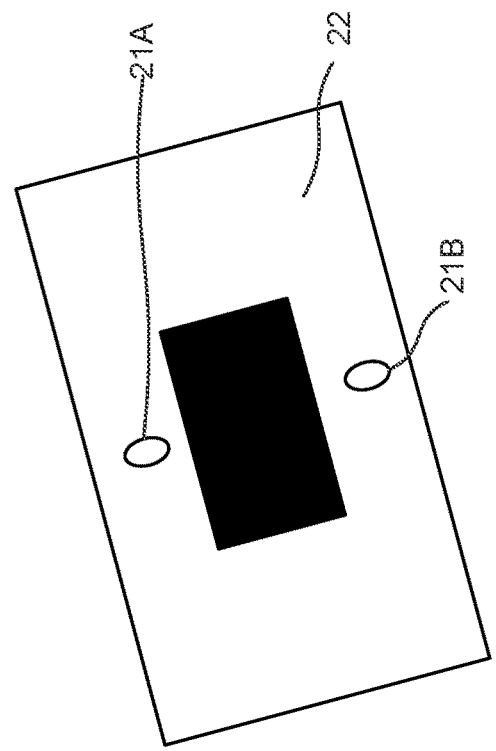

Set of ultrasonic sensors 140 and other ultrasonic sensor(s) 145 may be configured to receive ultrasonic signals at different frequencies/frequency ranges. For example, referring to FIG. 9A, set of ultrasonic sensors 140 may be configured to receive ultrasonic signals from ultrasonic emitter 21A at one or more frequencies/frequency ranges and other ultrasonic sensor(s) 145 may be configured to receive ultrasonic signals from ultrasonic emitter 21B at different frequencies/frequency ranges. Based on the times at which set of ultrasonic sensors 140 received ultrasonic signals from ultrasonic emitter 21A and other ultrasonic sensor(s) 145 received ultrasonic signals from ultrasonic emitter 21B, charger arm 130 may be rotated about one or more axes so that the orientation of charger arm 130 matches the orientation of charge port 22 (as shown in FIG. 9B).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 100 and electronic storage 120 are shown to be connected to an interface 160 in FIG. 1, any communication medium may be used to facilitate interaction between any components of system 10. One or more components of system 10 may communicate with each other through hard-wired communication, wireless communication, or both. For example, one or more components of system 10 may wirelessly communicate with electronic storage 120. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 100 is shown in FIG. 1 as a single entity, this is for illustrative purposes only. In some implementations, processor 100 may comprise a plurality of processing units. These processing units may be physically located within the same device, or processor 100 may represent processing functionality of a plurality of devices operating in coordination. Processor 100 may be configured to execute one or more components by software; hardware; firmware; some combination of software, hardware, and/or firmware; and/or other mechanisms for configuring processing capabilities on processor 100.

It should be appreciated that although computer components are illustrated in FIG. 1 as being co-located within a single processing unit, in implementations in which processor 100 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 112 and/or 114 may be eliminated, and some or all of its functionality may be provided by other computer program components. As another example, processor 100 may be configured to execute one or more additional computer program components that may perform some or all of the functionality attributed to one or more of computer program components 112 and/or 114 described herein.

The electronic storage media of electronic storage 120 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 120 may be a separate component within system 10, or electronic storage 120 may be provided integrally with one or more other components of system 10 (e.g., processor 100). Although electronic storage 120 is shown in FIG. 1 as a single entity, this is for illustrative purposes only. In some implementations, electronic storage 120 may comprise a plurality of storage units. These storage units may be physically located within the same device, or electronic storage 120 may represent storage functionality of a plurality of devices operating in coordination.

Figure 2:
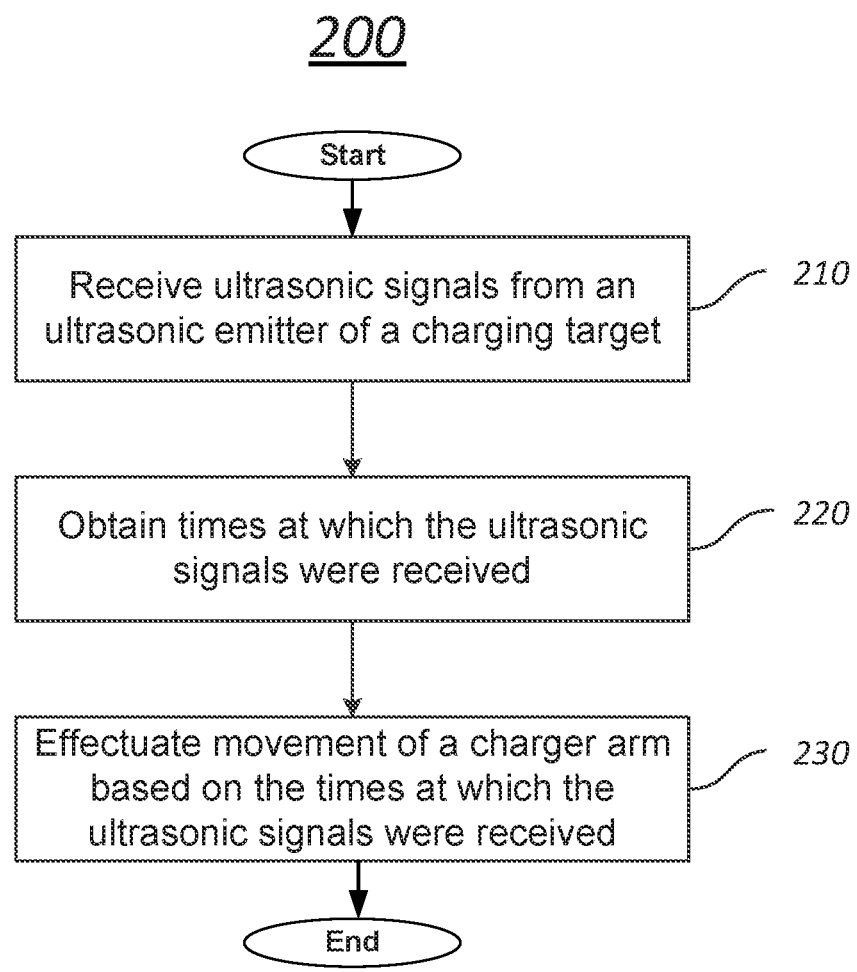
FIG. 2 illustrates a charge port detection method in accordance with some implementations of the disclosure.

FIG. 2 illustrates charge port detection method 200. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 210, ultrasonic signals may be received from an ultrasonic emitter of a charging target. The ultrasonic signals may be received by a set of ultrasonic sensors carried by the charger arm. The set of ultrasonic sensors may include a first ultrasonic sensor, a second ultrasonic sensor, and a third ultrasonic sensor. The first, second, and third ultrasonic sensors may be separated from each other by a distance. In some implementations, operation 210 may be performed by one or more sensors the same as or similar to set of ultrasonic sensors 140 (shown in FIG. 1 and described herein).

At operation 220, times at which the set of ultrasonic sensors received the ultrasonic signals may be obtained. In some implementations, operation 220 may be performed by a processor component the same as or similar to time component 112 (shown in FIG. 1 and described herein).

At operation 230, the movement of the charger arm may be effectuated based on the times at which the set of ultrasonic sensors received the ultrasonic signals. The movement of the charger arm may align the charger arm to a charge portion of the charging target. In some implementations, operation 230 may be performed by a processor component the same as or similar to movement component 114 (shown in FIG. 1 and described herein).

Spatially relative terms such as "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A charge port detector system comprising:
   a charger arm;
   a set of ultrasonic sensors carried by the charger arm, the set of ultrasonic sensors configured to receive ultrasonic signals from an ultrasonic emitter of a charging target, the set of ultrasonic sensors including a first ultrasonic sensor, a second ultrasonic sensor, and a third ultrasonic sensor, wherein the first, second, and third ultrasonic sensors are separated from each other by a distance; and
   one or more physical processors configured by machine-readable instructions to:
      obtain times at which the set of ultrasonic sensors received the ultrasonic signals; and
      effectuate the movement of the charger arm based on the times at which the set of ultrasonic sensors received the ultrasonic signals, the movement of the charger arm aligning the charger arm to a charge port of the charging target.

2. The charge port detector system of claim 1, wherein the set of ultrasonic sensors is arranged in an L configuration.

3. The charge port detector system of claim 1, wherein the set of ultrasonic sensors generates analog response signals in response to receiving the ultrasonic signals.

4. The charge port detector system of claim 3, further comprising an analog-to-digital converter configured to convert the analog response signals to digital response signals.

5. The charge port detector system of claim 4, wherein the analog-to-digital converter includes a Schmitt trigger.

6. The charge port detector system of claim 1, wherein effectuating the movement of the charger arm based on the times at which the set of ultrasonic sensors received the ultrasonic signals includes:
   comparing the times at which the set of ultrasonic sensors received the ultrasonic signals;
   determining which of the first ultrasonic sensor, the second ultrasonic sensor, and the third ultrasonic first received the ultrasonic signals; and
   effectuating the movement of the charger arm in a direction of at least one of the first ultrasonic sensor, the second ultrasonic sensor, and the third ultrasonic sensor that first received the ultrasonic signals.

7. The charge port detector system of claim 1, wherein effectuating the movement of the charger arm based on the times at which the set of ultrasonic sensors received the ultrasonic signals includes:
   effectuating the movement of the charger arm along a lateral axis based on the times at which the first ultrasonic sensor and the second ultrasonic sensor received the ultrasonic signals; and
   effectuating the movement of the charger arm along a vertical axis based on the times at which the first ultrasonic sensor and the third ultrasonic sensor received the ultrasonic signals.

8. The charge port detector system of claim 1, wherein effectuating the movement of the charger arm based on the times at which the set of ultrasonic sensors received the ultrasonic signals includes:
   determining a distance to the ultrasonic emitter based on the times at which the set of ultrasonic sensors received the ultrasonic signals; and
   effectuating the movement of the charger arm based on the distance.

9. The charge port detector system of claim 1, wherein effectuating the movement of the charger arm based on the times at which the set of ultrasonic sensors received the ultrasonic signals includes:
   determining a relative location of the charge port relative to the charger arm; and
   effectuating the movement of the charger arm based on the relative location.

10. The charge port detector system of claim 1, wherein:
    the one or more physical processors are further configured by machine-readable instructions to effectuate the movement of the charger arm along a longitudinal axis based on the times at which the set of ultrasonic sensors received the ultrasonic signals, the movement of the charger arm along the longitudinal axis mating the charger arm with the charge port of the charging target.

11. The charge port detector system of claim 1, wherein the charging target includes a vehicle.

12. A charge port detection method comprising:
receiving ultrasonic signals from an ultrasonic emitter of a charging target, the ultrasonic signals received by a set of ultrasonic sensors carried by a charger arm, the set of ultrasonic sensors including a first ultrasonic sensor, a second ultrasonic sensor, and a third ultrasonic sensor, wherein the first, second, and third ultrasonic sensors are separated from each other by a distance;
obtaining times at which the set of ultrasonic sensors received the ultrasonic signals; and
effectuating the movement of the charger arm based on the times at which the set of ultrasonic sensors received the ultrasonic signals, the movement of the charger arm aligning the charger arm to a charge port of the charging target.

13. The method of claim 12, wherein effectuating the movement of the charger arm based on the times at which the set of ultrasonic sensors received the ultrasonic signals includes:
comparing the times at which the set of ultrasonic sensors received the ultrasonic signals;
determining which of the first ultrasonic sensor, the second ultrasonic sensor, and the third ultrasonic first received the ultrasonic signals; and
effectuating the movement of the charger arm in a direction of at least one of the first ultrasonic sensor, the second ultrasonic sensor, and the third ultrasonic sensor that first received the ultrasonic signals.

14. The method of claim 12, wherein effectuating the movement of the charger arm based on the times at which the set of ultrasonic sensors received the ultrasonic signals includes:
effectuating the movement of the charger arm along a lateral axis based on the times at which the first ultrasonic sensor and the second ultrasonic sensor received the ultrasonic signals; and
effectuating the movement of the charger arm along a vertical axis based on the times at which the first ultrasonic sensor and the third ultrasonic sensor received the ultrasonic signals.

15. The method of claim 12, wherein effectuating the movement of the charger arm based on the times at which the set of ultrasonic sensors received the ultrasonic signals includes:
determining a distance to the ultrasonic emitter based on the times at which the set of ultrasonic sensors received the ultrasonic signals; and
effectuating the movement of the charger arm based on the distance.

16. The method of claim 12, wherein effectuating the movement of the charger arm based on the times at which the set of ultrasonic sensors received the ultrasonic signals includes:
determining a relative location of the charge port relative to the charger arm; and
effectuating the movement of the charger arm based on the relative location.

17. The method of claim 12, further comprising:
effectuating the movement of the charger arm along a longitudinal axis based on the times at which the set of ultrasonic sensors received the ultrasonic signals, the movement of the charger arm along the longitudinal axis mating the charger arm with the charge port of the charging target.

18. The method of claim 12, wherein the charging target includes a vehicle.

19. A vehicle charge port detector system comprising:
an ultrasonic emitter carried by a vehicle;
a charge port carried by the vehicle;
a charger arm;
a set of ultrasonic sensors carried by the charger arm, the set of ultrasonic sensors configured to receive ultrasonic signals from the ultrasonic emitter of the vehicle, the set of ultrasonic sensors including a first ultrasonic sensor, a second ultrasonic sensor, and a third ultrasonic sensor, wherein the first, second, and third ultrasonic sensors are separated from each other by a distance; and
one or more physical processors configured by machine-readable instructions to:
obtain times at which the set of ultrasonic sensors received the ultrasonic signals; and
effectuate the movement of the charger arm based on the times at which the set of ultrasonic sensors received the ultrasonic signals, the movement of the charger arm aligning the charger arm to the charge port of the vehicle.

20. The vehicle charge port detector system of claim 19, wherein effectuating the movement of the charger arm based on the times at which the set of ultrasonic sensors received the ultrasonic signals includes:
effectuating the movement of the charger arm along a lateral axis based on the times at which the first ultrasonic sensor and the second ultrasonic sensor received the ultrasonic signals; and
effectuating the movement of the charger arm along a vertical axis based on the times at which the first ultrasonic sensor and the third ultrasonic sensor received the ultrasonic signals.

* * * * *